United States Patent Office 2,841,577
Patented July 1, 1958

2,841,577
COBALT COMPLEXES OF 3-AMINO-4-HYDROXY-BENZENE SULFONYLMORPHOLINE AZO DYESTUFFS

Albert F. Strobel, Phillipsburg, N. J., and William W. Williams, Easton, Pa., assignors to General Aniline & Film Corporation, New York, N. Y., a corporation of Delaware No Drawing. Application August 20, 1954
Serial No. 451,293

3 Claims. (Cl. 260—146)

The present invention relates to a new class of cobalt monoazo dyes obtained by cobalting the product obtained by coupling the diazo of 3-amino-4-hydroxybenzene sulfonylmorpholine with acetoacetanilides yielding yellow shades on wool and nylon of excellent light- and washfastness.

The cobalt monoazo dyestuffs derived from the coupling of the diazo of 2-amino-1-phenol-4-sulfonamide with acetoacetanilides yield yellow shades on wool and nylon which have much poorer wet fastness properties than the morpholinyl sulfonyl dyes above.

We have found that cobalt complex monoazo dyes obtained by coupling the diazonium salt of 3-amino-4-hydroxybenzene sulfonylmorpholine with acetoacetanilides then metallizing with cobalt, yield dyes giving yellow shades on wool and nylon. The dyes are not only only characterized by their very good light- and washfastness, but are also adaptable as spirit soluble dyes, and for solvent dyeing of hydrophobics. These dyes, after metallizing with cobalt, are characterized by the following general formula:

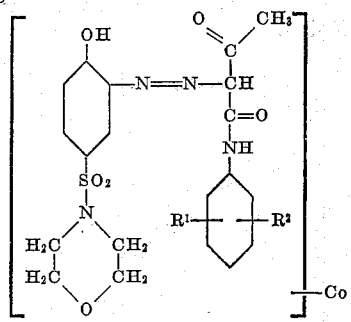

wherein $R^1$ and $R^2$ represent either hydrogen, chlorine, lower alkyl, e. g. methyl, ethyl, propyl, butyl, etc., lower alkoxy, e. g. methoxy, ethoxy, propoxy, butoxy etc. sulfamyl, alkyl sulfamyl, e. g. methyl sulfonyl, ethyl sulfamyl, propyl sulfamyl, butyl sulfamyl, etc., dialkyl sulfamyl, e. g. dimethyl-, diethyl-, dipropyl-, dibutyl-, sulfamyl, etc., sulfonylmorpholine, etc.

The dyes characterized by the above general formula are readily obtained by coupling the diazonium salt of 3-amino-4-hydroxybenzene sulfonylmorpholine with an acetoacetanilide. The 3-amino-4-hydroxybenzene sulfonylmorpholine is prepared in the following manner:

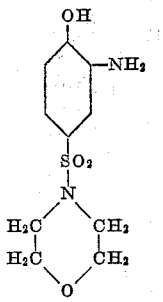

4-hydroxy-3-amino-benzene sulfonmorpholide

Into a 3-liter flask equipped with a stirrer, thermometer, and condenser fitted with an HCl trap and dropping funnel was charged 1100 grams chlorosulfonic acid. It was heated to 80° C., then over a 1-hour period 316 grams of 2-chloronitrobenzene was added. The reaction mixture was stirred 6 hours at 125° C. Then it was allowed to stand overnight. It was then drowned in about 6 liters of ice-water slush at —5-0° C. The slurry was stirred ½ hour and then filtered by suction. The wet cake was washed on the funnel with 1500 ml. ice-water.

Into a 8-liter battery jar was charged 435 grams of morpholine (=5 moles) and 4000 ml. ice-water slush. The jar was cooled by an ice-bath, and at 5° C. 586 grams of the above product was added slowly (over a period of 20 minutes). The slurry was stirred 6 hours at 5–10° C. and then the stirring was continued overnight. The temperature was raised to 60° C. 150 ml. 18% hydrochloric acid was added. The slurry was cooled to 15° C. and filtered. The wet cake was washed on the funnel with 2000 ml. ice water. It was allowed to stand in air overnight at room temperature (presscake). The weight of the presscake obtained amounted to 566 grams.

Into a 5-liter flask was charged 2700 ml. water and 360 grams of sodium hydroxide pellets. It was warmed to 90° C. and 508 grams of the presscake obtained above was added. The reaction mixture was stirred at reflux temperature for 5 hours, then filtered at 90° C. To the filtrate was added 1 liter water and 1240 ml. 18.5% hydrochloric acid to bring the material to Congo acidity. The wet filter cake was washed on the funnel with 2500 ml. ice water.

Into a 5-liter flask equipped with stirrer, thermometer, condenser and heating mantle was charged a hot solution of 960 grams of sodium sulfide. $9H_2O$ (=4.0 moles) in 1800 ml. water. Then 400 ml. 40% NaOH (=4.0 moles) was added. The solution was heated to 95° C. and the presscake from above was added. The reaction mixture was refluxed 3 hours at 97° C. The charge was filtered by suction. The filtrate was charged into an 8-liter battery jar and 2100 ml. 18.5% hydrochloric acid was added. The charge was stirred ½ hour at 95° C., and filtered hot. The sulfur cake was washed on the funnel with 800 ml. hot water. To the combined filtrate and washings was added 145 ml. 40% sodium hydroxide to pH=6.5. The slurry was cooled to 10° C. and filtered. The filter cake was washed on the funnel with 400 ml. ice water and air dried at 65° C.

The diazonium salt of the resulting sulfonylmorpholine is prepared in the conventional manner.

As the diazo component an acetoacetanilide is employed in the coupling reaction, the phenyl substituent of which may be substituted or unsubstituted. As examples of acetoacetanilides, the following are illustrative:

Acetoacetanilide
2-methoxy-acetoacetanilide
2,4-acetoacet-xylidide
4'-chloro-acetoacetanilide
3'-sulfamyl-acetoacetanilide
4'-N,N-dimethylsulfamyl-acetoacetanilide
4'-(N-morpholinosulfonyl)-acetoacetanilide
3'-(N-ethylsulfamyl)-acetoacetanilide
3'-(methylsulfonyl)-acetoacetanilide The metallizing of the dyes shown by the above general formula is carried out by the usual procedures. For the purpose of the present invention, we prefer to form the cobalt complex because of its new and unusual properties.

The following examples illustrate how the new class of monoazo dyestuff is prepared together with the formation of their cobalt complexes. All the parts given are by weight unless otherwise noted:

*Example I*

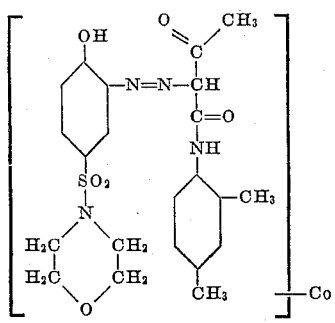

11.6 parts of (3.0/69 moles, 96.9%) 3-amino-4-hydroxybenzene sulfonylmorpholine was dissolved in 75 ml. water and 12.5 ml. conc. hydrochloric acid was added and the material cooled to 5° C. 20.2 ml. of 30% sodium nitrite (wt./vol.) was added slowly at 5° C. The diazo was stirred for 25 minutes and 1.4 ml. sulfamic acid was added. A coupler solution was prepared by dissolving 10.2 parts (=3.3/69 moles) of 2,4-acetoacet-xylidide in 75 ml. water, 12.5 ml. 40% (wt./vol.) sodium hydroxide, then 30 ml. 20% sodium carbonate was added and the material cooled to 10° C. The diazo was added to the coupler. Coupling occurred almost immediately. The material was stirred for one hour, was then filtered. The wet presscake was metallized with cobalt by dissolving the cake in 150 ml. isopropanol adding 5.7 parts (=1.5/69 moles) cobaltous chloride hexahydrate and refluxing the material for 3 hours. It was then poured into 200 ml. water and the isopropanol distilled off. The dye slurry was filtered and dried to give 17.5 parts dry dye.

The dry dye was kneaded for 3 hours in a Werner-Pfleiderer mixer with an equal weight of the formaldehyde condensation product of naphthalene-2-sodium-sulfonate. Small portions of water were added occasionally to keep the material in the form of a viscous paste during the milling. After the kneading, the material was dried with steam. The dry dispersed dye was dyed on wool as follows:

0.2 part of the dispersed dye, 0.3 part of ammonium sulfate was added to 300 ml. water. A 10 part sample of wool cloth was added to the dyebath and the temperature was raised to 100° C. over a period of 45 minutes, the cloth being agitated in the dyebath constantly. The temperature was held at 100° C. for one hour, after which the orange dyed cloth was removed, rinsed and dried. The exhaust from the dyebath was practically complete. The yellow dyed cloth showed outstanding fastness to light, and showed no loss in strength after subjecting it to AATCC wash test No. 3. The same dye applied to nylon gave a yellow shade, also with very good fastness properties.

*Example II*

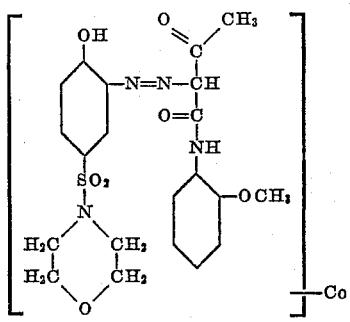

11.6 parts (=3.0/69 moles) of 4-hydroxy-3-aminobenzene sulfonylmorpholine was diazotized as in Example I. A coupler solution was prepared by dissolving 9.93 parts (=3.3/69 moles) of 2'-methoxy-acetoacetanilide in 75 ml. water and 12.5 ml. 40% (wt./vol.) sodium hydroxide. Then 30 ml. of 20% (wt./vol.) sodium carbonate was added and the mixture cooled to 10° C.

The diazo slurry was added to the coupler; coupling was completed almost immediately. The material was filtered. The presscake was dissolved in 200 ml. ethanol, 5.7 parts cobaltous chloride hexahydrate was added, and the whole was heated on a steam bath to reflux for 3 hours. After this 300 ml. water was added, the product was filtered and dried to give 18 parts of dry dye. Dispersion of the dye was carried out as in Example I. The dye gave a yellow shade on wool and nylon with very good light and wash fastness.

*Example III*

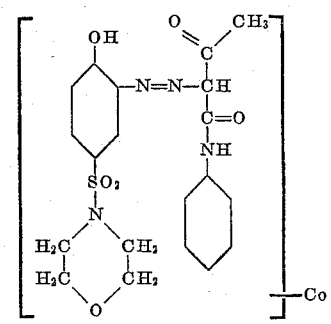

Preparation of the above dye is carried out exactly as in Example I, using an equimolar amount of acetoacetanilide in place of the 2,4-acetoacet-xylidide of Example I. Metallization is carried out as in Example I. Upon application to wool or nylon as in Example I, a brighter yellow shade is obtained, with slightly inferior light fastness to the dye of Example I, equal wash fastness to the dye of Example I.

*Example IV*

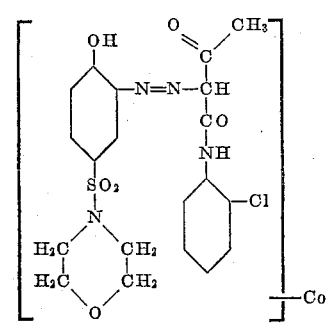

Preparation and application of the above dye is carried out as in Example I. A brownish yellow shade is obtained with slightly poorer light fastness and equal wash fastness to the dye of Example I.

*Example V*

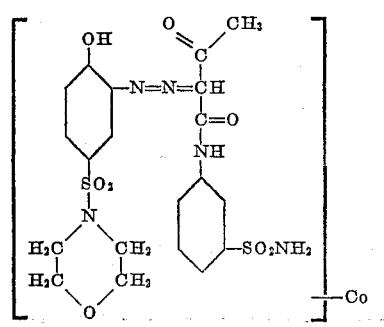

Preparation of

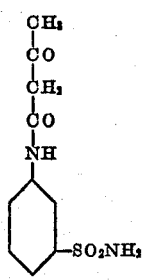

is carried out by reacting ethyl acetoacetate with 3-aminobenzene-sulfonamide in equimolar amounts in the usual manner for preparing acetoacetanilide.

Preparation of the above dye is carried out as in Example I using an equimolar amount of 3'-sulfamyl-acetoacetanilide in place of the 3,4-acetoacet-xylidide used in Example I. Application of the dye is carried out as in Example I. The product dyes wool yellow, with better light- and poorer wash-fastness than the dye of Example I.

What we claim is:

1. The cobalt complex compound of the monoazo dyestuff having the following general formula:

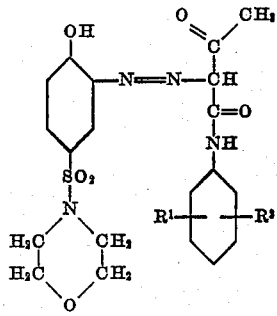

wherein $R^1$ and $R^2$ represent a member selected from a class consisting of hydrogen, chlorine, lower alkyl, lower alkoxy, sulfamyl, lower alkyl sulfamyl, lower dialkyl sulfamyl, and sulfonylmorpholine radicals, and in which the cobalt-dyestuff ratio is 1:2.

2. The cobalt complex compound of the monoazo dyestuff having the following formula:

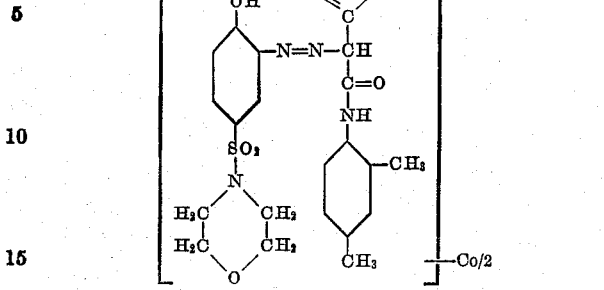

3. The cobalt complex compound of the monoazo dyestuff having the following formula:

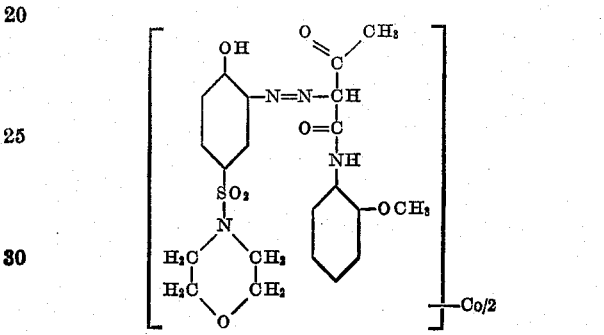

References Cited in the file of this patent

UNITED STATES PATENTS

| | | |
|---|---|---|
| 2,112,764 | Dahlen et al. | Mar. 29, 1938 |
| 2,683,707 | Brassel | July 13, 1954 |
| 2,734,895 | Zickendraht et al. | Feb. 14, 1956 |

FOREIGN PATENTS

| | | |
|---|---|---|
| 82,139 | Norway | July 27, 1953 |